United States Patent
Ho et al.

(10) Patent No.: US 10,868,308 B2
(45) Date of Patent: Dec. 15, 2020

(54) CATHODE SLURRY FOR LITHIUM ION BATTERY

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN)

(73) Assignee: GRST International Limited, Hong Kong (HK)

( * ) Notice: Subject to any disclaimer, the term of this patent is extended or adjusted under 35 U.S.C. 154(b) by 153 days.

(21) Appl. No.: 16/313,875

(22) PCT Filed: Sep. 29, 2017

(86) PCT No.: PCT/CN2017/104239
§ 371 (c)(1),
(2) Date: Dec. 27, 2018

(87) PCT Pub. No.: WO2018/068662
PCT Pub. Date: Apr. 19, 2018

(65) Prior Publication Data
US 2019/0157681 A1 May 23, 2019

Related U.S. Application Data

(60) Provisional application No. 62/406,402, filed on Oct. 11, 2016.

(51) Int. Cl.
*H01M 4/62* (2006.01)
*H01M 4/131* (2010.01)
*H01M 4/66* (2006.01)
*H01M 4/1391* (2010.01)
*H01M 10/0525* (2010.01)
*H01M 4/02* (2006.01)
*H01M 4/13* (2010.01)
*H01M 4/139* (2010.01)

(52) U.S. Cl.
CPC .......... *H01M 4/623* (2013.01); *H01M 4/131* (2013.01); *H01M 4/1391* (2013.01); *H01M 4/621* (2013.01); *H01M 4/663* (2013.01); *H01M 10/0525* (2013.01); *H01M 4/13* (2013.01); *H01M 4/139* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 8,900,753 B2 | 12/2014 | Konishi et al. | |
| 2013/0295440 A1* | 11/2013 | Lee | H01M 4/485 429/163 |
| 2015/0194664 A1 | 7/2015 | Saka et al. | |
| 2016/0087262 A1 | 3/2016 | Toya et al. | |
| 2016/0126553 A1* | 5/2016 | Murase | H01M 4/131 429/217 |
| 2016/0197345 A1* | 7/2016 | Tamaki | H01M 4/483 429/231.8 |
| 2016/0197346 A1* | 7/2016 | Myung | H01M 10/0568 429/223 |
| 2016/0260979 A1* | 9/2016 | Park | H01M 4/485 |
| 2016/0285102 A1 | 9/2016 | Shitaba et al. | |
| 2017/0309410 A1* | 10/2017 | Yamagata | H01G 11/38 |
| 2018/0083261 A1* | 3/2018 | Ho | F26B 3/04 |

FOREIGN PATENT DOCUMENTS

| | | | | |
|---|---|---|---|---|
| CN | 101499530 A | * | 8/2009 | ............ H01M 10/38 |
| CN | 101499530 A | | 8/2009 | |
| CN | 105149186 A | | 12/2015 | |
| JP | 2008147068 A | * | 6/2008 | ............ H01M 4/02 |
| WO | 2016017066 A1 | | 2/2016 | |

OTHER PUBLICATIONS

International Search Report of PCT Patent Application No. PCT/CN2017/104239 dated Dec. 29, 2017.
Search Report of Counterpart European Patent Application No. 17859484.2 dated Apr. 7, 2020.

* cited by examiner

*Primary Examiner* — Rena Dye Cronin

(57) ABSTRACT

Provided herein is a lithium-ion battery cathode slurry, comprising: a cathode active material, a conductive agent, a binder material, and a solvent, wherein the cathode active material has a particle size D50 in the range from about 10 μm to about 50 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%. The cathode slurry disclosed herein has homogeneous ingredient dispersion and quick drying capability for making a lithium-ion battery with high quality and consistent performance. In addition, these properties of the cathode slurry increase productivity and reduce the cost of manufacturing lithium-ion batteries.

17 Claims, No Drawings

CATHODE SLURRY FOR LITHIUM ION BATTERY

FIELD OF THE INVENTION

This invention relates to electrode slurries. In particular, this invention relates to a cathode slurry for the use in lithium-ion batteries.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

In general, a lithium ion battery includes a separator, a cathode and an anode. Currently, electrodes are prepared by dispersing fine powders of an active battery electrode material, a conductive agent, and a binder material in an appropriate solvent. The dispersion can be coated onto a current collector such as a copper or aluminum metal foil, and then dried at elevated temperature to remove the solvent. Sheets of the cathode and anode are subsequently stacked or rolled with the separator separating the cathode and anode to form a battery.

Characteristics of electrodes, especially cathode, can dramatically affect a number of aspects of the battery's performance, including capacity and stability. The critical process steps in battery production are coating and drying operations of cathode. Therefore, preparation of the cathode slurries is an essential first step towards the production of good quality batteries.

Residual solvent in the coating layer due to incomplete drying can contribute to adherence problems which will eventually affect the performance and quality of the batteries. One way to remove residual solvent from an electrode is to dry the electrode for a long period of time under high temperature. However, prolonged heating at high temperature may cause the coating to disintegrate due to aging of polymeric binder. The change of electrode characteristics is detrimental to the proper functioning of the completed battery.

Currently, much research and development is being performed related to electrode slurries. CN Patent Application No. 105149186 A describes a method for drying the electrode coating. The coated electrode is inductively heated by an induction heating coil to heat the metallic current collector to a desired temperature. However, the coated electrode may be non-uniformly heated due to nonuniform distribution of induced current density in the coil. This can create a problem with respect to obtaining rapid heating to a uniform temperature, affecting the quality of the coating.

U.S. Patent Application No. 20160087262 A1 describes a cathode active material with an average particle size of 2 to 8 μm for a high energy density lithium-ion battery. The cathode active material comprises a lithium nickel manganese composite oxide having a small and uniform particle size to improve the output characteristics of a lithium-ion battery. A specific discharge capacity of 150-200 mAh/g was obtained. However, 10 wt. % of binding agent is needed for binding the cathode active material and conductive material to the cathode current collector because of high specific surface area of the cathode active material. A large amount of binding agent in the electrode coating will reduce the energy density of a lithium-ion battery. Furthermore, the resulting cathode is required to be dried in a vacuum dryer at high temperature for 12 hours. The long time required for drying is considered to be not suitable for large scale production.

U.S. Pat. No. 8,900,753 B2 describes a cathode material which includes a mixture of a cathode active material having a large primary particle size and another cathode active material having a small primary particle size to ensure high safety and output characteristics. However, the coated cathode is also required to be dried at a temperature of 120° C. This will cause high energy consumption and high production cost on large-scale production of batteries.

In view of the above, there is a need for a continuous improvement of the cathode slurries with homogeneous ingredient dispersion and quick drying capability for battery performance and manufacturing efficiency reasons.

SUMMARY OF THE INVENTION

The aforementioned needs are met by various aspects and embodiments disclosed herein.

In one aspect, provided herein is a lithium-ion battery cathode slurry, comprising: a cathode active material, a conductive agent, a binder material, and a solvent, wherein the cathode active material has a particle size D50 in the range from about 10 μm to about 50 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%.

In some embodiments, the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, $LiNi_{0.4}Mn_{1.6}O_4$, composites thereof, and combinations thereof, wherein each x is independently from 0.3 to 0.8; each y is independently from 0 to 0.45; and each z is independently from 0 to 0.2.

In certain embodiments, the cathode active material is present in an amount from 30% to 65% by weight; the conductive agent is present in an amount from 0.8% to 5% by weight; the binder material is present in an amount from 0.5% to 6% by weight; and the solvent is present in an amount from 30% to 60% by weight, wherein the combined weight % value of all components does not exceed 100 wt. %; and wherein all weight % values are based on the total weight of the slurry. In other embodiments, the cathode active material is present in an amount from 35% to 50% by weight; the conductive agent is present in an amount from 1% to 4% by weight; the binder material is present in an amount from 0.8% to 3.5% by weight; and the solvent is present in an amount from 40% to 55% by weight, wherein the combined weight % value of all components does not exceed 100 wt. %; and wherein all weight % values are based on the total weight of the slurry.

In some embodiments, the cathode active material has a D10 value of at least 3 μm. In certain embodiments, the cathode active material has a D90 value of less than or equal to 80 μm. In some embodiments, the ratio D90/D10 of the cathode active material is from about 3 to about 10, or from about 5 to about 8.

In certain embodiments, the particle size distribution of the cathode active material is bimodal with a first peak at about 12 μm and a second peak at about 30 μm.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In certain embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In some embodiments, the solvent is selected from the group consisting of N-methyl-2-pyrrolidone, dimethylformamide, dimethyl sulfoxide, acetonitrile, butylene carbonate, propylene carbonate, ethyl bromide, tetrahydrofuran, dimethyl carbonate, diethyl carbonate, ethyl methyl carbonate, methyl propyl carbonate, ethylene carbonate, water, pure water, de-ionized water, distilled water, ethanol, isopropanol, methanol, acetone, n-propanol, t-butanol, and combinations thereof.

In certain embodiments, the solvent has a boiling point of less than 200° C., less than 180° C., less than 160° C., less than 140° C., less than 120° C., or less than 100° C.

In certain embodiments, the viscosity of the slurry is in the range from about 1,000 mPa·s to about 4,500 mPa·s.

In some embodiments, the vapor pressure of the solvent is at least 15 kPa.

In certain embodiments, the pH of the slurry is from about 7 to about 11.

In some embodiments, the coated slurry film is dried by a box oven, a conveyor oven, or a hot plate.

In some embodiments, the slurry coated onto the current collector in the form of a film has a drying time of about 5 minutes or less.

In another aspect, provided herein is a positive electrode for a lithium-ion battery, the positive electrode comprising: a cathode current collector and a cathode electrode layer dispersed on the cathode current collector, wherein the cathode electrode layer is formed using the cathode slurry prepared by the method disclosed herein.

In another aspect, provided herein is a lithium-ion battery comprising: a cathode, an anode and a separator interposed between the cathode and the anode, wherein at least one of the cathode is the positive electrode prepared by the method disclosed herein.

DETAILED DESCRIPTION OF THE INVENTION

General Definitions

The term "conductive agent" refers to a chemical or a substance that increases the electrical conductivity of an electrode.

The term "binder material" refers to a chemical or a substance that can be used to hold the active battery electrode material and conductive agent in place.

The term "applied" or "applying" refers to an act of laying or spreading a layer of slurry on a surface of the current collector.

The term "current collector" refers to a support for coating the active battery electrode material and a chemically inactive high electron conductor for keeping an electric current flowing to electrodes during discharging or charging a secondary battery.

The term "still air" refers to the air surrounding the coating being substantially motionless. In the absence of air flow, a wind speed of less than 0.2 m/s was observed at a position 1 cm above the top surface of the coating surface. In some embodiments, the wind speed is less than 0.1 m/s. In certain embodiments, the wind speed is 0 m/s.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

The term "homogenizer" refers to an equipment that can be used for homogenization of materials. The term "homogenization" refers to a process of reducing a substance or material to small particles and distributing it uniformly throughout a fluid. Any conventional homogenizers can be used for the method disclosed herein. Some non-limiting examples of the homogenizer include stirring mixers, blenders, mills (e.g., colloid mills and sand mills), ultrasonicators, atomizers, rotor-stator homogenizers, and high pressure homogenizers.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour and the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "transfer coating" or "roll coating" refers to a process for fabrication of large area films on rigid or flexible substrates. A slurry is applied on the substrate by transferring a coating from the surface of a coating roller with pressure. A coating thickness can be controlled by an adjustable gap width between a metering blade and a surface of the coating roller, which allows the deposition of variable wet layer thicknesses. In a metering roll system, the thickness of the coating is controlled by adjusting the gap between a metering roller and a coating roller.

The term "particle size D50" refers to a volume-based accumulative 50% size (D50) which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which are formed by mutual agglomeration and sintering of primary particles, and in a case where the particles are composed of the primary particles only, it means a volume-averaged particle size of the primary particles. Furthermore, D10 means a volume-based accumulative 10% size (i.e., a diameter of a particle in the 10th percentile of the volumes of particles), and D90 means a volume-based accumulative 90% size (i.e., a diameter of a particle in the 90th percentile of the volumes of particles).

The term "vapor pressure" of a fluid refers to the pressure exerted by the vapor of that fluid with the liquid phase in thermodynamic equilibrium at a given temperature in a closed system.

The term "solid content" refers to the amount of non-volatile material remaining after evaporation.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is a lithium-ion battery cathode slurry, comprising: a cathode active material, a conductive agent, a binder material, and a solvent, wherein the cathode active material has a particle size D50 in the range from about 10 μm to about 50 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%.

Conventionally, in order to achieve a higher packing density of a cathode, cathode active material having a smaller particle size is preferred. Generally, the average particle size of the cathode active material is preferred being in the range of 0.05 μm to 5 μm. An electrode in which cathode active materials of different particle diameters are included has also been used as a cathode for a lithium secondary battery. Accordingly, the spaces between the large diameter particles are filled with the small diameter particles. However, a dense coating will retard evaporation of solvent from the interior of the coating. The curing steps of current processes are time consuming. The drying time can be shortened upon exposure to high temperatures. However, this often leads to poor electrode quality and significantly poorer cell performance because of nonuniform drying. In other words, a slurry comprising a cathode active material having particles with a particular range of particle size and size ratio that allows a relatively high drying rate has not been developed, and a slurry capable of high processability is desired. Therefore, there is always a need for a new cathode slurry that is simple, reliable and cost-effective to be used for making a lithium ion battery with high quality and consistent performance.

In some embodiments, the cathode active material is selected from the group consisting of $LiCoO_2$ (LCO), $LiNiO_2$ (LNO), $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$ (LMO), $LiFeO_2$, $LiFePO_4$ (LFP), $LiNi_{0.5}Mn_{1.5}O_4$, $LiNi_{0.4}Mn_{1.6}O_4$, and combinations thereof, wherein each x is independently from 0.3 to 0.8; each y is independently from 0.1 to 0.45; and each z is independently from 0 to 0.2. In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, $LiNi_{0.4}Mn_{1.6}O_4$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, or $LiNi_{0.4}Mn_{1.6}O_4$. In further embodiments, the cathode active material is not $LiNi_xMn_yO_2$, $Li_{1+z}Ni_xMn_yCo_{1-x-y}O_2$, or $LiNi_xCo_yAl_zO_2$, wherein each x is independently from 0.3 to 0.8; each y is independently from 0.1 to 0.45; and each z is independently from 0 to 0.2. In some embodiments, the cathode active material is $LiNi_{0.33}Mn_{0.33}Co_{0.33}O_2$ (NMC333), $LiNi_{0.5}Mn_{0.3}Co_{0.2}O_2$ (NMC532), $LiNi_{0.4}Mn_{0.4}Co_{0.2}O_2$, $LiNi_{0.6}Mn_{0.2}Co_{0.2}O_2$ (NMC622), $LiNi_{0.8}Mn_{0.1}Co_{0.1}O_2$ (NMC811) or $LiNi_{0.8}Co_{0.15}Al_{0.05}O_2$ (NCA).

In certain embodiments, the cathode active material is doped with a dopant selected from the group consisting of Fe, Ni, Mn, Al, Mg, Zn, Ti, La, Ce, Sn, Zr, Ru, Si, Ge, and combinations thereof. In some embodiments, the dopant is not Fe, Ni, Mn, Mg, Zn, Ti, La, Ce, Ru, Si, or Ge. In certain embodiments, the dopant is not Al, Sn, or Zr. In some embodiments, the cathode active material is not doped with a dopant.

In some embodiments, the cathode active material comprises or is a core-shell composite comprising a core comprising a lithium transition metal oxide and a shell formed by coating the surface of the core with a transition metal oxide. In certain embodiments, the lithium transition metal oxide is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, $LiNi_{0.4}Mn_{1.6}O_4$, and combinations thereof, wherein each x is independently from 0.3 to 0.8; each y is independently from 0.1 to 0.45; and each z is independently from 0 to 0.2. In some embodiments, the transition metal oxide is selected from the group consisting of $Fe_2O_3$, $MnO_2$, $Al_2O_3$, MgO, ZnO, $TiO_2$, $La_2O_3$, $CeO_2$, $SnO_2$, $ZrO_2$, $RuO_2$, and combinations thereof.

In certain embodiments, the cathode active material comprises or is a core-shell composite having a core and shell structure, wherein the core and the shell each independently comprise a lithium transition metal oxide selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, $LiNi_{0.4}Mn_{1.6}O_4$, and combinations thereof, wherein each x is independently from 0.3 to 0.8; each y is independently from 0.1 to 0.45; and each z is independently from 0 to 0.2. In other embodiments, the core and the shell each independently comprise two or more lithium transition metal oxides. The two or more lithium transition metal oxides in the core and the shell may be the same, or may be different or partially different. In some embodiments, the two or more lithium transition metal oxides are uniformly distributed over the core. In certain embodiments, the two or more lithium transition metal oxides are not uniformly distributed over the core.

In some embodiments, each of the lithium transition metal oxides in the core and the shell is independently doped with a dopant selected from the group consisting of Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core. In certain embodiments, the two or more doped lithium transition metal oxides are not uniformly distributed over the core.

In some embodiments, the diameter of the core is from about 5 μm to about 45 μm, from about 5 μm to about 35 μm, from about 5 μm to about 25 μm, from about 10 μm to about 40 μm, or from about 10 μm to about 35 μm. In certain embodiments, the thickness of the shell is from about 15 μm to about 45 μm, from about 15 μm to about 30 μm, from about 15 μm to about 25 μm, from about 20 μm to about 30 μm, or from about 20 μm to about 35 μm.

In some embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 80:20, 70:30, 60:40, 50:50, 40:60, or 30:70.

In certain embodiments, the cathode active material does not comprise a core-shell structure. In some embodiments, the cathode active material is not doped with a dopant Fe, Ni, Mn, Al, Mg, Zn, Ti, La, Ce, Sn, Zr, Ru, Si, or Ge. In some embodiments, the core and the shell each independently does not comprise $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, or $LiNi_{0.4}Mn_{1.6}O_4$, wherein each x is independently from 0.3 to 0.8; each y is independently from 0.1 to 0.45; and each z is independently from 0 to 0.2.

If the particle diameter D50 of the cathode active material is larger than about 10 μm, there will be space created between the large diameter particles in the coated film on the current collector, allowing effective drying of the coated film in a short period of time. In some embodiments, the cathode active material of the present invention has a particle size D50 in the range from about 10 μm to about 50 μm, from about 10 μm to about 45 μm, from about 10 μm to about 40 μm, from about 10 μm to about 35 μm, from about 10 μm to about 30 μm, from about 10 μm to about 25 μm, from about 15 μm to about 45 μm, from about 15 μm to about 30 μm, from about 20 μm to about 50 μm, from about 20 μm to about 40 μm, from about 20 μm to about 30 μm, from about 25 μm to about 45 μm, from about 25 μm to about 40 μm, from about 30 μm to about 40 μm, or from about 30 μm to about 50 μm.

In certain embodiments, the particle diameter D50 of the cathode active material is less than 50 μm, less than 45 μm, less than 40 μm, less than 35 μm, less than 30 μm, less than 25 μm, less than 20 μm, or less than 15 μm. In some embodiment, the particle diameter D50 of the cathode active material is greater than 10 μm, greater than 15 μm, greater than 20 μm, greater than 25 μm, greater than 30 μm, greater than 35 μm, greater than 40 μm, or greater than 45 μm. In certain embodiments, the particle diameter D50 of the cathode active material is about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, or about 50 μm.

In certain embodiments, the cathode active material has a particle size D10 from about 3 μm to about 20 μm, from about 3 μm to about 10 μm, from about 3 μm to about 8 μm, from about 1 μm to about 10 μm, from about 1 μm to about 8 μm, from about 1 μm to about 5 μm, from about 2 μm to about 10 μm, from about 2 μm to about 5 μm, or from about 2 μm to about 8 μm.

In some embodiments, the cathode active material has a particle size D90 from about 20 μm to about 80 μm, from about 30 μm to about 80 μm, from about 40 μm to about 80 μm, from about 50 μm to about 80 μm, from about 30 μm to about 70 μm, from about 30 μm to about 60 μm, from about 20 μm to about 50 μm, from about 20 μm to about 60 μm, or from about 40 μm to about 60 μm.

In certain embodiments, the ratio D90/D10 of the cathode active material is from about 3 to about 15, from about 3 to about 10, from about 3 to about 8, from about 5 to about 15, from about 5 to about 10, from about 5 to about 8, from about 7.5 to about 20, from about 10 to about 20, or from about 10 to about 15.

In some embodiments, the amount of the cathode active material is from about 10% to about 80%, from about 10% to about 70%, from about 10% to about 60%, from about 10% to about 50%, from about 10% to about 40%, from about 10% to about 30%, from about 10% to about 20%, from about 30% to about 70%, from about 30% to about 60%, from about 30% to about 50%, from about 30% to about 40%, from about 40% to about 70%, from about 40% to about 60%, from about 40% to about 50%, from about 45% to about 50%, from about 25% to about 60%, from about 25% to about 50%, from about 25% to about 40%, from about 35% to about 65%, from about 35% to about 50% or from about 35% to about 45% by weight or volume, based on the total weight or volume of the slurry. In certain embodiments, the amount of the cathode active material is at least 10%, at least 15%, at least 20%, at least 25%, at least 27.5%, at least 30%, at least 32.5%, at least 35%, at least 37.5%, at least 40%, at least 42.5%, at least 45%, at least 47.5%, at least 50%, at least 52.5%, at least 55%, at least 57.5, or at least 60% by weight or volume, based on the total weight or volume of the slurry. In certain embodiments, the amount of the cathode active material is at most 25%, at most 27.5%, at most 30%, at most 32.5%, at most 35%, at most 37.5%, at most 40%, at most 42.5%, at most 45%, at most 47.5%, at most 50%, at most 52.5%, at most 55%, at most 57.5%, or at most 60% by weight or volume, based on the total weight or volume of the slurry. In some embodiments, the amount of the cathode active material is about 40%, about 41%, about 42%, about 43%, about 44%, about 45%, about 46%, about 47%, about 48%, about 49%, about 50%, about 51%, about 52%, about 53%, about 54%, or about 55% by weight or volume, based on the total weight or volume of the slurry.

The conductive agent in the slurry is for enhancing the electrical conductivity of a cathode. In some embodiments, the conductive agent is selected from the group consisting of carbon, carbon black, graphite, expanded graphite, graphene, graphene nanoplatelets, carbon fibres, carbon nanofibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In some embodiments, the particle size of conductive agent is from about 10 nm to about 100 nm, from about 10 nm to about 50 nm, from about 10 nm to about 45 nm, from about 10 nm to about 40 nm, from about 10 nm to about 35 nm, from about 10 nm to about 30 nm, from about 10 nm to about 25 nm, from about 10 nm to about 20 nm, from about 10 nm to about 15 nm, from about 20 nm to about 50 nm, from about 20 nm to about 40 nm, from about 25 nm to about 50 nm, from about 30 nm to about 50 nm, or from about 30 nm to about 40 nm.

In some embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In certain embodiments, the binder material is selected from the group consisting of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, a salt of alginic acid, and combinations thereof.

In some embodiments, the binder material is selected from SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, or a salt of alginic acid.

In certain embodiments, the amount of each of the conductive agent and binder material is independently at least 0.1%, at least 0.25%, at least 0.5%, at least 0.75%, at least 1%, at least 1.25%, at least 1.5%, at least 1.75%, at least 2%, at least 2.25%, at least 2.5%, at least 2.75%, at least 3%, at least 4%, at least 5%, at least 10%, at least 15%, at least 20%, at least 25%, at least 30%, at least 35%, at least 40%, at least 45%, or at least 50% by weight or volume, based on the total weight or volume of the slurry. In some embodiments, the amount of each of the conductive agent and binder material is independently at most 0.1%, at most 0.25%, at most 0.5%, at most 0.75%, at most 1%, at most 1.25%, at most 1.5%, at most 1.75%, at most 2%, at most 2.25%, at most 2.5%, at most 2.75%, at most 3%, at most 4%, at most 5%, at most 10%, at most 15%, at most 20%, at most 25%, at most 30%, at most 35%, at most 40%, at most 45%, or at most 50% by weight or volume, based on the total weight or volume of the slurry.

In some embodiments, the amount of the conductive agent is from about 0.02% to about 1%, from about 0.02% to about 0.5%, from about 0.02% to about 0.25%, from about 0.05% to about 1%, from about 0.05% to about 0.5%, from about 0.12% to about 1.25%, from about 0.12% to about 1%, from about 0.25% to about 2.5%, from about 0.5% to about 2.5%, from about 0.5% to about 2%, from about 1% to about 3%, from about 1% to about 2.5%, from about 1% to about 2%, from about 1% to about 1.5%, from about 1.5% to about 3%, from about 1% to about 2.5%, from about 1.5% to about 3.5%, or from about 2.5% to about 5% by weight or volume, based on the total weight or volume of the slurry. In certain embodiments, the amount of the conductive agent is about 0.5%, about 0.75%, about 1%, about 1.25%, about 1.5%, about 1.75%, about 2%, about 2.25%, about 2.5%, about 2.75%, or about 3% by weight or volume, based on the total weight or volume of the slurry.

In certain embodiments, the amount of the binder material is from about 0.5% to about 5%, from about 0.5% to about 2.5%, from about 1% to about 5%, from about 1% to about 4%, from about 1% to about 3%, from about 1% to about 2%, from about 1.5% to about 3%, from about 1.5% to about 2%, from about 2.5% to about 5%, from about 2.5% to about 4%, from about 2.5% to about 3%, from about 3.5% to about 8%, from about 3.5% to about 7%, from about 3.5% to about 6%, from about 3.5% to about 5%, from about 3.7% to about 7.5%, from about 5% to about 10%, from about 7.5% to about 12.5%, from about 10% to about 20%, or from about 17.5% to about 25% by weight or volume, based on the total weight or volume of the slurry. In some embodiments, the amount of the binder material is about 0.5%, about 0.75%, about 1%, about 1.25%, about 1.5%, about 1.75%, about 2%, about 2.25%, about 2.5%, about 2.75%, about 3%, about 3.5%, about 4%, about 4.5%, or about 5% by weight or volume, based on the total weight or volume of the slurry.

The slurry is prepared by mixing the cathode active material with auxiliary materials such as conductive agent and binder material in a solvent. The mixing process aims to achieve a uniform dispersion of the particles of the cathode active material, conductive agent and binder material in a solvent.

The solvent used in the slurry can be any polar organic solvent. The polar organic solvent can be any polar protic or polar aprotic organic solvent having a dielectric constant of greater than 15, greater than 20, greater than 25, greater than 30, greater than 35, greater than 40, or greater than 45. Some non-limiting examples of the polar protic organic solvent include alcohols such as benzyl alcohol, ethylene glycol, n-butanol, isopropanol, n-propanol, ethanol, and methanol. Some non-limiting examples of the polar aprotic organic solvent include ketone solvents, acetate solvents, ester solvent such as propionate esters, and carbonate solvents. Some non-limiting examples of the ketone solvents include methyl propyl ketone, methyl isobutyl ketone, ethyl propyl ketone, diisobutyl ketone, acetophenone, N-methyl-2-pyrrolidone (NMP), acetone, and the like. Some non-limiting examples of the acetate solvents include ethyl acetate, butyl acetate, isobutyl acetate, and the like. Some non-limiting examples of the propionate esters such as n-butyl propionate, n-pentyl propionate and ethylene glycol monoethylether propionate are also suitable. Some non-limiting examples of the carbonate solvents comprise dimethyl carbonate, diethyl carbonate, ethylene carbonate, propylene carbonate, butylene carbonate, ethyl methyl carbonate, methyl propyl carbonate, and the like. Other non-limiting examples of the polar aprotic organic solvent include tetrahydrofuran, dimethylformamide, acetonitrile, and dimethyl sulfoxide. In some embodiments, the solvent used in the slurry comprises a polar protic solvent, a polar aprotic solvent, or a combination thereof.

An aqueous solvent can also be used for producing the slurry. Transition to an aqueous-based process may be desirable to reduce emissions of volatile organic compound, and increase processing efficiency. In certain embodiments, the solvent used in the slurry is a solution containing water as the major component and a volatile solvent, such as alcohols, lower aliphatic ketones, lower alkyl acetates or the like, as the minor component in addition to water. In some embodiments, the amount of water is at least 50%, at least 55%, at least 60%, at least 65%, at least 70%, at least 75%, at least 80%, at least 85%, at least 90%, or at least 95% to the total amount of water and solvents other than water. In certain embodiments, the amount of water is at most 55%, at most 60%, at most 65%, at most 70%, at most 75%, at most 80%, at most 85%, at most 90%, or at most 95% to the total amount of water and solvents other than water. In some embodiments, the solvent consists solely of water, that is, the proportion of water in the solvent is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In some embodiments, the volatile solvent or minor component is methyl ethyl ketone, ethanol, ethyl acetate or a combination thereof.

In certain embodiments, the solvent is a mixture of water and one or more water-miscible minor components. In some embodiments, the solvent is a mixture of water and a minor component selected from methanol, ethanol, isopropanol, n-propanol, t-butanol, n-butanol, and combinations thereof. In certain embodiments, the volume ratio of water and the minor component is from about 51:49 to about 100:1.

In some embodiments, the solvent is water. Since the composition of the slurry does not contain any organic solvent, expensive, restrictive and complicated handling of organic solvents is avoided during manufacture of slurries. Some non-limiting examples of water include tap water, bottled water, purified water, pure water, distilled water, de-ionized water, $D_2O$, or a combination thereof. In some embodiments, the solvent is de-ionized water.

In certain embodiments, the solvent comprises a volatile solvent, a nonvolatile solvent or a combination thereof. In some embodiments, the solvent comprises a mixture of NMP and at least one alcohol solvent selected from the group consisting of n-butanol, isopropanol, n-propanol, ethanol, and methanol. In further embodiments, the solvent comprises a mixture of NMP and ethanol or a mixture of NMP and isopropanol. In some embodiments, the solvent comprises a mixture of NMP and at least one ketone solvent selected from the group consisting of methyl propyl ketone, methyl isobutyl ketone, ethyl propyl ketone, diisobutyl ketone, acetophenone, and acetone. In further embodiments, the solvent comprises a mixture of NMP and acetone. In certain embodiments, the solvent comprises a mixture of NMP and at least one carbonate solvent selected from the group consisting of dimethyl carbonate, diethyl carbonate, ethylene carbonate, propylene carbonate, butylene carbonate, ethyl methyl carbonate, and methyl propyl carbonate. In further embodiments, the solvent comprises a mixture of NMP and dimethyl carbonate. In other embodiments, the solvent comprises a mixture of NMP and water, water and ethanol, or water and dimethyl carbonate. In certain embodiments, the volatile solvent is the major component which provides slurry with rapid drying properties. In some embodiments, the volume ratio of volatile solvent and the nonvolatile solvent is from about 51:49 to about 100:1.

A slurry having a solvent with high vapor pressure can be dried at a higher rate. In some embodiments, the vapor pressure of the solvent at a temperature from about 65° C. to 90° C. is independently from about 0.01 kPa to about 200 kPa, from about 0.01 kPa to about 150 kPa, from about 0.01 kPa to about 100 kPa, from about 0.1 kPa to about 200 kPa, from about 0.1 kPa to about 150 kPa, from about 0.1 kPa to about 100 kPa, from about 0.3 kPa to about 200 kPa, from about 0.3 kPa to about 150 kPa, from about 0.3 kPa to about 100 kPa, from about 0.3 kPa to about 80 kPa, from about 0.3 kPa to about 60 kPa, from about 0.3 kPa to about 40 kPa, from about 0.3 kPa to about 20 kPa, from about 10 kPa to about 200 kPa, from about 10 kPa to about 150 kPa, from about 10 kPa to about 100 kPa, from about 10 kPa to about 80 kPa, from about 10 kPa to about 60 kPa, or from about 10 kPa to about 40 kPa.

In certain embodiments, the vapor pressure of the solvent at a temperature from about 60° C. to 90° C. is independently less than 200 kPa, less than 150 kPa, less than 100 kPa, less than 90 kPa, less than 80 kPa, less than 70 kPa, less than 60 kPa, less than 50 kPa, less than 40 kPa, less than 30 kPa, less than 20 kPa, less than 10 kPa, less than 5 kPa, less than 1 kPa, less than 0.5 kPa, less than 0.3 kPa, or less than 0.1 kPa. In some embodiments, the vapor pressure of the solvent at a temperature from about 60° C. to 90° C. is independently at least 0.01 kPa, at least 0.05 kPa, at least 0.1 kPa, at least 0.5 kPa, at least 1 kPa, at least 5 kPa, at least 10 kPa, at least 20 kPa, at least 30 kPa, at least 40 kPa, at least 50 kPa, at least 60 kPa, at least 70 kPa, at least 80 kPa, at least 90 kPa, at least 100 kPa, at least 150 kPa, or at least 200 kPa.

A slurry having a solvent with a low boiling point can be dried at a faster rate. In some embodiments, the boiling point of the solvent is from about 40° C. to about 250° C., from about 40° C. to about 200° C., from about 40° C. to about 150° C., from about 40° C. to about 100° C., from about 40°

C. to about 90° C., from about 40° C. to about 80° C., from about 40° C. to about 70° C., from about 40° C. to about 60° C., from about 60° C. to about 100° C., from about 60° C. to about 90° C., from about 60° C. to about 80° C., or from about 60° C. to about 70° C. In certain embodiments, the boiling point of the solvent is less than 250° C., less than 200° C., less than 150° C., less than 100° C., less than 90° C., less than 80° C., less than 70° C., less than 60° C., or less than 50° C. In some embodiments, the boiling point of the solvent is at least 40° C., at least 50° C., at least 60° C., at least 70° C., at least 80° C., at least 90° C., at least 100° C., at least 150° C., or at least 200° C.

In some embodiments, the solvent is present in an amount from about 20% to about 80%, from about 20% to about 70%, from about 20% to about 60%, from about 20% to about 50%, from about 20% to about 40%, from about 30% to 50%, from about 30% to about 40%, from about 40% to about 70%, from about 40% to about 60%, from about 40% to about 50%, from about 50% to about 80%, from about 50% to about 70%, from about 50% to about 60%, from about 25% to about 60%, from about 25% to about 50%, from about 25% to about 45%, from about 45% to about 60%, from about 45% to about 55%, or from about 45% to about 50% by weight or volume, based on the total weight or volume of the slurry.

In certain embodiments, the solvent is present in an amount less than 80%, less than 70%, less than 60%, less than 55%, less than 50%, less than 45%, less than 40%, less than 35%, less than 30%, less than 25%, or less than 20% by weight or volume, based on the total weight or volume of the slurry. In some embodiments, the solvent is present in an amount at least 15%, at least 20%, at least 25%, at least 30%, at least 35%, at least 40%, at least 45%, at least 50%, at least 55%, at least 60%, at least 70%, or at least 80% by weight or volume, based on the total weight or volume of the slurry. In certain embodiments, the amount of solvent is about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% by weight or volume, based on the total weight or volume of the slurry.

In some embodiments, the weight percentage of solvent is more than total weight percentage of cathode active material, conductive agent and binder material. In certain embodiments, the weight percentage of solvent is less than total weight percentage of cathode active material, conductive agent and binder material. In some embodiments, the weight percentage of solvent is equal to the total weight percentage of cathode active material, conductive agent and binder material.

In certain embodiments, the weight percentage of cathode active material is more than the weight percentage of conductive agent. In some embodiments, the ratio of the weight percentage of cathode active material to the weight percentage of conductive agent in the slurry is from about 1 to about 100, from about 1 to about 80, from about 1 to about 60, from about 1 to about 50, from about 10 to about 50, from about 10 to about 40, from about 10 to about 35, from about 10 to about 30, from about 10 to about 25, from about 10 to about 20, from about 20 to about 60, from about 20 to about 50, from about 20 to about 45, from about 20 to about 40, from about 30 to about 50, from about 30 to about 40, from about 40 to about 60, from about 40 to about 50, from about 20 to about 30, or from about 20 to about 25. In some embodiments, the ratio of the weight percentage of cathode active material to the weight percentage of conductive agent in the slurry is less than 100, less than 80, less than 60, less than 50, less than 45, less than 40, less than 35, less than 30, less than 25, less than 20, or less than 10. In certain embodiments, the ratio of the weight percentage of cathode active material to the weight percentage of conductive agent in the slurry is at least 1, at least 10, at least 20, at least 25, at least 30, at least 35, at least 40, at least 45, at least 50, at least 55, at least 60, or at least 80. In some embodiments, the ratio of the weight percentage of cathode active material to the weight percentage of conductive agent in the slurry is about 15, about 16, about 17, about 18, about 19, about 20, about 21, about 22, about 23, about 24, about 25, about 26, about 27, about 28, about 29, or about 30.

In certain embodiments, the weight percentage of cathode active material is more than the weight percentage of binder material. In some embodiments, the ratio of the weight percentage of cathode active material to the weight percentage of binder material in the slurry is from about 1 to about 100, from about 1 to about 80, from about 1 to about 60, from about 1 to about 50, from about 5 to about 50, from about 5 to about 45, from about 5 to about 40, from about 5 to about 35, from about 5 to about 30, from about 5 to about 25, from about 5 to about 20, from about 5 to about 15, from about 15 to about 50, from about 15 to about 40, from about 15 to about 35, from about 15 to about 30, from about 15 to about 25, or from about 15 to about 20. In certain embodiments, the ratio of the weight percentage of cathode active material to the weight percentage of binder material in the slurry is less than 100, less than 80, less than 60, less than 50, less than 45, less than 40, less than 35, less than 30, less than 25, less than 20, less than 15, or less than 10. In some embodiments, the ratio of the weight percentage of cathode active material to the weight percentage of binder material in the slurry is at least 5, at least 10, at least 15, at least 20, at least 25, at least 30, at least 35, at least 40, at least 45, at least 50, at least 60, at least 70, or at least 80. In certain embodiments, the ratio of the weight percentage of cathode active material to the weight percentage of binder material in the slurry is about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, or about 40.

In some embodiments, the weight percentage of binder material is more than the weight percentage of conductive agent. In certain embodiments, the weight percentage of binder material is less than the weight percentage of conductive agent. In some embodiments, the weight percentage of binder material is equal to the weight percentage of conductive agent. In certain embodiments, the ratio of the weight percentage of binder material to the weight percentage of conductive agent is from about 0.1 to about 5, from about 0.5 to about 4.5, from about 0.5 to about 4, from about 0.5 to about 3.5, from about 0.5 to about 3, from about 0.5 to about 2.5, from about 0.5 to about 2, from about 0.5 to about 1.5, from about 0.5 to about 1, from about 1 to about 5, from about 1 to about 4, from about 1 to about 3, from about 1 to about 2, or from about 1 to about 1.5. In some embodiments, the ratio of the weight percentage of binder material to the weight percentage of conductive agent is less than 5, less than 4.5, less than 4, less than 3.5, less than 3, less than 2.5, less than 2, less than 1.5, less than 1, or less than 0.5. In certain embodiments, the ratio of the weight percentage of binder material to the weight percentage of conductive agent is at least 0.5, at least 1, at least 1.5, at least 2, at least 2.5, at least 3, at least 3.5, at least 4, or at least 4.5.

Electrode coating layers are typically prepared by coating a suspension of particles containing a cathode active material, conductive agent and binder material onto a support and allowing the suspension to dry into a thin film. It is generally desired that the cathode slurry can dry as quickly as possible. This improves productivity of a coating system, thus reducing overall processing time. Generally, the cathode slurry comprises a cathode active material as a main component. One method of preparing a rapid-dry slurry is to use cathode active material having large particle size. Particle size distribution plays a crucial role in determining specific surface area of the cathode active material. The larger surface area allows a greater interaction with the solvent, which results in slower drying.

A bimodal particle distribution can enhance packing efficiency. In some embodiments, the cathode active material comprises a mixture of particles of two size distributions where a particle size of a peak of a second distribution being greater than a particle size of a peak of a first distribution. In certain embodiments, a first peak of the bimodal distribution may be between about 5 μm and about 20 μm, and a second peak of the bimodal distribution may be between about 20 μm and about 40 μm. In some embodiments, the particle size distribution of the cathode active material is bimodal with a first peak at about 10 μm and a second peak at about 25 μm. The packing density increases when the small particles fill the interstices between the larger particles.

In certain embodiments, the difference between the diameters at the two peaks of the distribution is less than or equal to 80%, less than or equal to 60%, less than or equal to 50%, or less than or equal to 35%.

In some embodiments, the weight ratio of the cathode active material having a particle size of a peak of a second distribution to the cathode active material having a particle size of a peak of a first distribution is from 3:1 to 5:1. In certain embodiments, the weight ratio of the cathode active material having a particle size of a peak of a second distribution to the cathode active material having a particle size of a peak of a first distribution is 5:1, 4:1 or 3:1.

Before the coating operation, it is very important to mix the cathode active material, binder material, and conductive agent uniformly. When changing from using traditional solvent such as NMP to water, agglomeration of the particles of slurry component may occur. The surface tension among all components should be as low as possible to enhance compatibility. Various methods have been proposed to tackle this problem, for example, by adding a dispersing agent to lower the surface tension of the slurry.

In certain embodiments, the dispersing agent is a nonionic surfactant, an anionic surfactant, a cationic surfactant, an amphoteric surfactant, or a combination thereof.

Some non-limiting examples of suitable nonionic surfactant include an alkoxylated alcohol, a carboxylic ester, a polyethylene glycol ester, and combinations thereof. Some non-limiting examples of suitable alkoxylated alcohol include ethoxylated and propoxylated alcohols. In certain embodiments, the nonionic surfactant is nonylphenol ethoxylate.

Some non-limiting examples of suitable anionic surfactant include a salt of an alkyl sulfate, an alkyl polyethoxylate ether sulfate, an alkyl benzene sulfonate, an alkyl ether sulfate, a sulfonate, a sulfosuccinate, a sarcosinate, and combinations thereof. In some embodiments, the anionic surfactant comprises a cation selected from the group consisting of sodium, potassium, ammonium, and combinations thereof. In certain embodiments, the anionic surfactant is lithium dodecyl sulfate, sodium dodecylbenzene sulfonate, or sodium stearate.

Some non-limiting examples of suitable cationic surfactant include an ammonium salt, a phosphonium salt, an imidazolium salt, a sulfonium salt, and combinations thereof. Some non-limiting examples of suitable ammonium salt include stearyl trimethylammonium bromide (STAB), cetyl trimethylammonium bromide (CTAB), myristyl trimethylammonium bromide (MTAB), trimethylhexadecyl ammonium chloride and combinations thereof.

Some non-limiting examples of suitable amphoteric surfactant are surfactants that contain both cationic and anionic groups. The cationic group is ammonium, phosphonium, imidazolium, sulfonium, or a combination thereof. The anionic hydrophilic group is carboxylate, sulfonate, sulfate, phosphonate, or a combination thereof.

In certain embodiments, the dispersing agent is selected from the group consisting of lithium dodecyl sulfate, trimethylhexadecyl ammonium chloride, alcohol ethoxylate, nonylphenol ethoxylate, sodium dodecylbenzene sulfonate, sodium stearate, and combinations thereof.

One of the advantages of the present invention is that the formulation of the slurry of the present invention prevents agglomeration of particles in water without the use of surfactant and allows rapid drying of the slurry when coated on a current collector. In some embodiments, the slurry is free of surfactant. In certain embodiments, the slurry is free of a nonionic surfactant, an anionic surfactant, a cationic surfactant, or an amphoteric surfactant.

A thorough mixing of the slurries is critical since agglomerated particles or inhomogeneous distribution of the components in the slurries will affect the coating and drying operations and eventually the performance and quality of the batteries. The slurry can be homogenized by a homogenizer. The homogenizing step reduces or eliminates the potential aggregation of the cathode active material and the conductive agent and enhances dispersion of each ingredient in the slurry. Any equipment that can homogenize the slurry can be used. In some embodiments, the homogenizer is a stirring mixer, a blender, a mill, an ultrasonicator, a rotor-stator homogenizer, or a high pressure homogenizer.

In some embodiments, the homogenizer is an ultrasonicator. Any ultrasonicator that can apply ultrasound energy to agitate and disperse particles in a sample can be used herein. In some embodiments, the ultrasonicator is a probe-type ultrasonicator or an ultrasonic flow cell.

After homogenization, a uniform slurry is obtained. The viscosity of the slurry affects the quality of the ultimate coating. If the viscosity of the slurry is too high, it may result in the formation of a non-uniform coating. Further, if the viscosity of the slurry is too low, a satisfactory film is hardly obtainable.

Particle agglomeration increases the drying time of the slurry because solvent may be trapped within the agglomerates, thereby making evaporation of solvent more difficult. Using larger cathode material particles reduces the occurrence of particle agglomeration. Also, the pH of the slurry also affects the stability of particles in the slurry. When the pH of the slurry is out of the desired range, binder material is more difficult to be dispersed uniformly in the slurry. This may cause uneven drying and shrinkage of the coated film. The pH of the slurry may be affected by dispersing a nickel-rich cathode active material in an aqueous solvent because nickel-rich material may react with water to cause an increase in pH. Large-sized particles of the cathode active material has a small specific surface area Therefore, pH variation due to reaction of cathode active material with water is reduced.

In some embodiments, the pH of the cathode slurry is from about 7 to about 11, from about 7 to about 10.5, from about 7 to about 10, from about 7 to about 9.5, from about 7 to about 9, from about 7 to about 8.5, from about 7 to about 8, from about 7 to about 7.5, from about 7.5 to about 11, from about 7.5 to about 10, from about 7.5 to about 9, from about 7.5 to about 8, from about 8 to about 11, from about 8 to about 10.5, from about 8 to about 10, from about 8 to about 9.5, from about 8 to about 9, from about 8 to about 8.5, from about 9 to about 11, or from about 9 to about 10. In certain embodiments, the pH of the cathode slurry is less than 12, less than 11.5, less than 11, less than 10.5, less than 10, less than 9.5, less than 9, less than 8.5, less than 8, less than 7.5, or less than 7. In some embodiments, the pH of the cathode slurry is at least 7, at least 7.5, at least 8, at least 8.5, at least 9, at least 9.5, at least 10, at least 10.5, or at least 11. In certain embodiments, the pH of the cathode slurry is about 7, about 7.5, about 8, about 8.5, about 9, about 9.5, about 10, about 10.5, or about 11.

In some embodiment, the cathode slurry has a viscosity from about 500 mPa·s to about 6,000 mPa·s, from about 500 mPa·s to about 5,500 mPa·s, from about 500 mPa·s to about 5,000 mPa·s, from about 500 mPa·s to about 4,500 mPa·s, from about 500 mPa·s to about 4,000 mPa·s, from about 500 mPa·s to about 3,500 mPa·s, from about 500 mPa·s to about 3,000 mPa·s, from about 1,000 mPa·s to about 6,000 mPa·s, from about 1,000 mPa·s to about 5,500 mPa·s, from about 1,000 mPa·s to about 5,000 mPa·s, from about 1,000 mPa·s to about 4,500 mPa·s, from about 1,000 mPa·s to about 4,000 mPa·s, from about 1,000 mPa·s to about 3,500 mPa·s, from about 1,000 mPa·s to about 3,000 mPa·s, from about 1,000 mPa·s to about 2,500 mPa·s, from about 1,000 mPa·s to about 2,000 mPa·s, from about 1,500 mPa·s to about 4,000 mPa·s, from about 1,500 mPa·s to about 3,500 mPa·s, from about 1,500 mPa·s to about 3,000 mPa·s, from about 2,000 mPa·s to about 4,000 mPa·s, from about 2,000 mPa·s to about 3,500 mPa·s, or from about 2,000 mPa·s to about 3,000 mPa·s.

In certain embodiments, the cathode slurry has a viscosity less than 6,000 mPa·s, less than 5,500 mPa·s, less than 5,000 mPa·s, less than 4,500 mPa·s, less than 4,000 mPa·s, less than 3,500 mPa·s, less than 3,000 mPa·s, less than 2,500 mPa·s, less than 2,000 mPa·s, or less than 1,000 mPa·s. In some embodiments, the cathode slurry has viscosity more than 1,000 mPa·s, more than 1,500 mPa·s, more than 2,000 mPa·s, more than 2,500 mPa·s, more than 3,000 mPa·s, more than 3,500 mPa·s, more than 4,000 mPa·s, more than 4,500 mPa·s, more than 5,000 mPa·s, or more than 5,500 mPa·s.

When the amount of the solid content in the slurry is low, drying time becomes longer due to a larger amount of solvent in the slurry. In some embodiments, the solid content of the cathode slurry is from about 20% to about 80%, from about 20% to about 70%, from about 20% to about 60%, from about 20% to about 50%, from about 20% to about 40%, from about 30% to about 70%, from about 30% to about 60%, from about 30% to about 50%, from about 30% to about 40%, from about 40% to about 70%, from about 40% to about 60%, from about 40% to about 50%, from about 25% to about 60%, from about 35% to about 60%, or from about 45% to about 60% by weight, based on the total weight of the cathode slurry.

In certain embodiments, the solid content of the cathode slurry is less than 80%, less than 70%, less than 60%, less than 55%, less than 50%, less than 45%, less than 40%, less than 35%, less than 30%, or less than 25% by weight, based on the total weight of the cathode slurry. In some embodiments, the solid content of the cathode slurry is at least 20%, at least 25%, at least 30%, at least 35%, at least 40%, at least 45%, at least 50%, at least 55%, or at least 60% by weight, based on the total weight of the cathode slurry. In certain embodiments, the solid content of the cathode slurry is about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% by weight, based on the total weight of the cathode slurry.

The homogenized slurry can be applied on a current collector to form a coated film on the current collector. The current collector acts to collect electrons generated by electrochemical reactions of the active battery electrode material or to supply electrons required for the electrochemical reactions. In some embodiments, each of the current collectors of the positive and negative electrodes, which can be in the form of a foil, sheet or film, is independently stainless steel, titanium, nickel, aluminum, copper or electrically-conductive resin. In certain embodiments, the current collector of the positive electrode is an aluminum thin film. In some embodiments, the current collector of the negative electrode is a copper thin film. In certain embodiments, the surface of current collector is not pre-treated.

In some embodiments, the current collector has a thickness from about 6 μm to about 100 μm since thickness will affect the volume occupied by the current collector within a battery and the amount of the active battery electrode material and hence the capacity in the battery.

In certain embodiments, the coating process is performed using a doctor blade coater, a slot-die coater, a transfer coater, a spray coater, a roll coater, a dip coater, or a curtain coater. In some embodiments, the thickness of the coated film on the current collector is from about 10 μm to about 300 μm, or from about 20 μm to about 100 μm.

After applying the homogenized slurry on a current collector, the coated film on the current collector can be dried by a dryer to obtain the battery electrode. Any dryer that can dry the coated film on the current collector can be used herein. Some non-limiting examples of the dryer are a batch drying oven, a box-type drying oven, a hot plate, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

In some embodiments, the conveyor drying oven for drying the coated film on the current collector includes one or more heating sections, wherein each of the heating sections is individually temperature controlled, and wherein each of the heating sections may include independently controlled heating zones.

In certain embodiments, the conveyor drying oven comprises a first heating section positioned on one side of the conveyor and a second heating section positioned on an opposing side of the conveyor from the first heating section, wherein each of the first and second heating sections independently comprises one or more heating elements and a temperature control system connected to the heating elements of the first heating section and the second heating section in a manner to monitor and selectively control the temperature of each heating section.

In some embodiments, the cathode slurry comprises at least one solvent having a boiling point below 150° C. The choice and amount of solvent affects the curing conditions. Selection of solvent with a lower boiling point enables faster drying at lower temperature. A lower temperature can avoid crack or embrittlement of a cathode electrode layer. In some embodiments, the coated film on the current collector can be dried at a temperature from about 45° C. to about 100° C., from about 50° C. to about 100° C., from about 55° C. to about 100° C., from about 50° C. to about 90° C., from about 50° C. to about 80° C., from about 55° C. to about 80° C., from about 55° C. to about 75° C., from about 55° C. to about 70° C., from about 50° C. to about 80° C., from about 50° C. to about 70° C., from about 60° C. to about 100° C., from about 60° C. to about 90° C., from about 60° C. to about 80° C., from about 45° C. to about 90° C., from about 45° C. to about 80° C., or from about 45° C. to about 70° C. In certain embodiments, the coated film on the current collector can be dried at a temperature less than 100° C., less than 95° C., less than 90° C., less than 85° C., less than 80° C., less than 75° C., less than 70° C., less than 65° C., less than 60° C., less than 55° C., less than 50° C., less than 45° C., or less than 40° C. In some embodiments, the coated film on the current collector can be dried at a temperature higher than 40° C., higher than 45° C., higher than 50° C., higher than 55° C., higher than 60° C., higher than 65° C., higher than 70° C., higher than 75° C., higher than 80° C., higher than 85° C., or higher than 90° C.

The coated film should not be dried under windy conditions which may cause non-uniform slurry distribution and in turn affect the quality of the coated electrode. In some embodiments, the coated film on the current collector can be dried under still air conditions. In certain embodiments, the coated film on the current collector can be dried under an environment having a wind speed between 0.2 m/s and 1 m/s, or between 0.2 m/s and 0.7 m/s. In further embodiments, the wind speed is less than 0.7 m/s, less than 0.5 m/s, less than 0.4 m/s, less than 0.3 m/s, less than 0.2 m/s, or less than 0.1 m/s. In certain embodiments, the wind speed is 0 m/s.

During drying at low or moderate humidity, solvent leaves a coating more rapidly, thereby permitting faster drying at lower temperatures. In some embodiments, the coated film on the current collector can be dried under an environment having a relative humidity from about 0% to about 60%, from about 10% to about 50%, from about 20% to about 50%, from about 20% to about 40%, from about 25% to about 40%, from about 15% to about 50%, from about 15% to about 40%, from about 15% to about 30%, from about 15% to about 25%, or from about 20% to about 30%. In certain embodiments, the relative humidity is less than 50%, less than 45%, less than 40%, less than 35%, less than 30%, less than 25%, less than 20%, less than 15%, or less than 10%.

The cathode slurry disclosed herein can be dried in a short period of time. In some embodiments, the coated film can be dried for a time period from about 1 minute to about 15 minutes, from about 1 minute to about 10 minutes, from about 1 minute to about 8 minutes, from about 1 minute to about 5 minutes, from about 1 minute to about 4 minutes, from about 1 minute to about 3 minutes, from about 1 minute to about 2 minutes, from about 1.5 minutes to about 5 minutes, from about 1.5 minutes to about 4 minutes, from about 1.5 minutes to about 3 minutes, from about 2 minutes to about 10 minutes, from about 2 minutes to about 5 minutes, from about 2 minutes to about 4 minutes, from about 2 minutes to about 3 minutes, from about 3 minutes to about 5 minutes, from about 3 minutes to about 4 minutes, from about 4 minutes to about 5 minutes, from about 2.5 minutes to about 5 minutes, from about 2.5 minutes to about 4 minutes, or from about 3.5 minutes to about 5 minutes. In certain embodiments, the coated film can be dried for a time period of less than 12 hours, less than 8 hours, less than 4 hours, less than 2 hours, less than 1 hour, less than 45 minutes, less than 30 minutes, less than 15 minutes, less than 13 minutes, less than 10 minutes, less than 9 minutes, less than 8 minutes, less than 7 minutes, less than 6 minutes, less than 5 minutes, less than 4.5 minutes, less than 4 minutes, less than 3.5 minutes, less than 3 minutes, less than 2.5 minutes, less than 2 minutes, or less than 1.5 minutes. If the drying rate is too slow, manufacturing efficiency suffers.

After drying, solvent has been removed from the coated film. Comparison of the mass of the coated electrode dried for a predetermined time to a coated electrode dried for a prolonged period of time is used as a measurement of the extent of drying. During the prolonged period of drying, the amount of solvent that can be removed from the coated electrode dried for a predetermined time is less than 2 percent by weight, based on total weight of the coated electrode involving drying for a predetermined time period.

After the coated film on the current collector is dried, the battery electrode is formed. In some embodiments, the battery electrode is compressed mechanically in order to enhance the density of the electrode.

In another aspect, provided herein is a lithium-ion battery comprising a cathode, an anode and a separator interposed between the cathode and the anode, wherein at least one of the cathode is the positive electrode prepared by the method disclosed herein.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The wind speed was determined by measuring the wind speed at a position 1 cm above the top surface of the coated film by means of a commercially available anemometer.

The particle size was analyzed using a MicroBrook 2000LD particle size analyzer (obtained from Brookhaven Instruments Cooperation, US).

The slurry viscosity was determined with a NDJ-5S viscometer (obtained from Shanghai Hengping Scientific Instrument Co., China).

Example 1

A) Preparation of Cathode Active Material

A particulate cathode active material $Li_{1.02}Ni_{0.35}Mn_{0.34}Co_{0.31}O_2$ (NMC333) was obtained by a co-precipitation method followed by calcination at 850° C. The calcinated product was crushed by a jet mill (LNJ-6A, obtained from Mianyang Liuneng Powder Equipment Co., Ltd., Sichuan, China) for about 1 hour, followed by passing through a 270-mesh sieve to obtain a cathode active material having a particle size D50 of about 42 μm.

B) Preparation of Positive Electrode Slurry

A positive electrode slurry was prepared by mixing 92 wt. % cathode active material prepared by method described above, 4 wt. % carbon black (SuperP; obtained from Timcal Ltd, Bodio, Switzerland) as a conductive agent, 4 wt. % polyvinylidene fluoride (PVDF; Solef® 5130, obtained from Solvay S. A., Belgium) as a binder material, which were dispersed in a mixed solvent containing 50 wt. % N-methyl-2-pyrrolidone (NMP; purity of ≥99%, Sigma-Aldrich, USA) and 50 wt. % acetone (purity of ≤99%, Sigma-Aldrich, USA) to form a slurry with a solid content of 50 wt. %. The slurry was homogenized by a planetary stirring mixer. The viscosity of the positive electrode slurry was 1,850 mPa·s.

C) Preparation of Positive Electrode

The homogenized slurry was coated onto one side of an aluminum foil having a thickness of 20 μm as a current collector using a doctor blade coater (MSK-AFA-III, obtained from Shenzhen Kejing Star Technology Ltd., China) with a gap width of 100 μm. The coated film on the aluminum foil was dried in a box-type resistance oven (DZF-6020, obtained from Shenzhen Kejing Star Technology Co. Ltd., China) at 65° C. under still air condition having a wind speed between 0.1 m/s and 0.2 m/s. The relative humidity inside the oven was 25-35%. The drying time was about 3 minutes.

D) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder material, and 5 wt. % carbon black as a conductive agent, which were dispersed in deionized water to form another slurry with a solid content of 50 wt. %. The slurry was coated onto both sides of a copper foil having a thickness of 9 μm using a doctor blade coater (MSK-AFA-III, Shenzhen Kejing Star Technology Ltd., China) with a gap width of 120 μm. The coated film on the copper foil was dried by an electrically heated conveyor oven at 80° C. for 10 minutes to obtain a negative electrode.

E) Assembling of Pouch Cell

A pouch cell was assembled by packaging the dried electrode assembly in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

F) Electrochemical Measurements

The cyclability performance of the pouch cell was tested by charging and discharging at a constant current rate of 1C between 3.0 V and 4.2 V. The electrochemical tests show good electrochemical stability of the battery in a wide range of potential, as well as outstanding cycle performance.

The formulation of the cathode slurry of Example 1 is shown in Table 1 below. The drying conditions of the coated cathode film of Example 1 are shown in Table 2 below. The electrochemical performance of the pouch cell of Example 1 are shown in Table 3 below.

Example 2

A) Preparation of Cathode Active Material

A particulate cathode active material $Li_{0.98}Mn_{2.1}O_4$ (LMO) was obtained by a co-precipitation method followed by calcination at 900° C. The calcinated product was crushed by a jet mill for about 1 hour, followed by passing through a 400-mesh sieve to obtain a cathode active material having a particle size D50 of about 15 μm.

B) Preparation of Positive Electrode Slurry

A positive electrode slurry was prepared by mixing 92 wt. % cathode active material prepared by method described above, 3 wt. % carbon black (SuperP; obtained from Timcal Ltd, Bodio, Switzerland) as a conductive agent, and 1 wt. % CMC (BSH-12, DKS Co. Ltd., Japan), 2 wt. % SBR (AL-2001, NIPPON A&L INC., Japan) and 2 wt. % polyvinylidene fluoride (PVDF; Solef® 5130, obtained from Solvay S. A., Belgium) as a binder material, which were dispersed in a mixed solvent containing 50 wt. % deionized water and 50 wt. % ethanol to form a slurry with a solid content of 50 wt. %. The slurry was homogenized by a planetary stirring mixer. A viscosity of the positive electrode slurry was 1,650 mPa·s.

C) Preparation of Positive Electrode

The homogenized slurry was coated onto one side of an aluminum foil having a thickness of 20 μm as a current collector using a doctor blade coater with a gap width of 100 μm. The coated film on the aluminum foil was dried by an electrically heated conveyor oven (TH-1A, obtained from Nanjing Tonghao Drying Equipment Co. Ltd., China) at 60° C. at a conveyor speed of about 5 meters/minute. The oven was arranged in a substantially windless environment. A wind speed between 0.3 m/s and 0.5 m/s inside the oven was detected. The relative humidity inside the oven was 25-40%. The drying time was about 4.5 minutes.

Example 3

A) Preparation of Cathode Active Material

A particulate cathode active material $Li_{1.05}Mn_{1.94}O_4$ (LMO) was obtained by a co-precipitation method followed by calcination at 900° C. The calcinated product was crushed by a ball milling for about 1.5 hours, followed by passing through a 325-mesh sieve to obtain the cathode active material having a particle size D50 of about 28 μm.

B) Preparation of Positive Electrode Slurry

A positive electrode slurry was prepared by mixing 94 wt. % cathode active material prepared by method described above, 3 wt. % carbon black (SuperP; obtained from Timcal Ltd, Bodio, Switzerland) as a conductive agent, and 1.5 wt. % polyacrylic acid (PAA, #181285, obtained from Sigma-Aldrich, US) and 1.5 wt. % polyacrylonitrile (LA 132, Chengdu Indigo Power Sources Co., Ltd., China) as a binder material, which were dispersed in deionized water to form a slurry with a solid content of 50 wt. %. The slurry was homogenized by a planetary stirring mixer. The viscosity of the positive electrode slurry was 2,300 mPa·s.

C) Preparation of Positive Electrode

The homogenized slurry was coated onto one side of an aluminum foil having a thickness of 20 μm as a current collector using a doctor blade coater with a gap width of 100 μm. The coated film on the aluminum foil was dried by an electrically heated conveyor oven at 75° C. at a conveyor speed of about 8 meters/minute. The oven was arranged in a substantially windless environment. A wind speed between 0.1 m/s and 0.3 m/s inside the oven was detected. The relative humidity inside the oven was 25-40%. The drying time was about 3 minutes.

D) Assembling of Coin Cells

CR2032 coin-type Li cells were assembled in an argon-filled glove box. The coated cathode and anode sheets prepared by the method described in Example 1 were cut into disc-form positive and negative electrodes for coin cell assembly. The electrolyte was a solution of $LiPF_6$ (1 M) in a mixture of ethylene carbonate (EC), ethyl methyl carbonate (EMC) and dimethyl carbonate (DMC) in a volume ratio of 1:1:1.

E) Electrochemical Measurements

The coin cells were analyzed in a constant current mode using a multi-channel battery tester (BTS-4008-5V10mA, obtained from Neware Electronics Co. Ltd, China). After 1 cycle at C/20 was completed, they were charged and discharged at a rate of C/2. The charging/discharging cycling tests of the cells were performed between 3.0 and 4.2 V with at a current density of C/2 at 25° C. to obtain the discharge capacity. The discharge capacity was 126 mAh/g.

The very rapid drying rate did not result in shrinkage of the coating layer and therefore did not damage the coating layer and its electrochemical performance. In addition, the cathode electrode layer containing the cathode active material, conductive agent and binder had high uniformity and thus the prepared positive electrode had high conductivity, capacity as well as stability.

Example 4

A) Preparation of Cathode Active Material

A particulate cathode active material $Li_{1.01}Ni_{0.53}Mn_{0.30}Co_{0.17}O_2$ (NMC532) was obtained by a co-precipitation method followed by a calcination at 900° C. The calcinated product was crushed by a ball milling for about 1.5 hours, followed by passing through a 270 mesh sieve to obtain a cathode active material having a particle size D50 of about 33 μm.

B) Preparation of Positive Electrode Slurry

A positive electrode slurry was prepared by mixing 94 wt. % cathode active material prepared by method described above, 3 wt. % carbon black (SuperP; obtained from Timcal Ltd, Bodio, Switzerland) as a conductive agent, and 0.8 wt. % polyacrylic acid (PAA, #181285, obtained from Sigma-Aldrich, US), 1.5 wt. % styrene butadiene rubber (SBR, AL-2001, obtained from NIPPON A&L INC., Japan) and 0.7 wt. % polyvinylidene fluoride (PVDF; Solef® 5130, obtained from Solvay S. A., Belgium) as a binder material, which were dispersed in acetone (purity of ≥99%, Sigma-Aldrich, USA) to form a slurry with a solid content of 50 wt. %. The slurry was homogenized by a planetary stirring mixer. The viscosity of the positive electrode slurry was 2,550 mPa·s.

C) Preparation of Positive Electrode

The homogenized slurry was coated onto one side of an aluminum foil having a thickness of 20 μm as a current collector using a doctor blade coater with a gap width of 100 μm. The coated film on the aluminum foil was dried by an electrically heated conveyor oven at 65° C. at a conveyor speed of about 7 meters/minute. The oven was arranged in a substantially windless environment. A wind speed between 0.3 m/s and 0.5 m/s inside the oven was detected. The relative humidity inside the oven was 20-40%. The drying time was about 3.5 minutes.

D) Assembling of Coin Cells

CR2032 coin-type Li cells were prepared by the method described in Example 3.

E) Electrochemical Measurements

Electrochemical measurements of coin-type cells of Example 4 were performed by the method described in Example 3. The discharge capacity was 152 mAh/g.

The very rapid drying rate did not result in shrinkage of the coating layer and therefore did not damage the coating layer and its electrochemical performance. In addition, the cathode electrode layer containing the cathode active material, conductive agent and binder had high uniformity and thus the prepared positive electrode had high conductivity, capacity as well as stability.

Examples 5-7

Cathode active material of Examples 5 and 6 were obtained from Xiamen Tungsten Co. Ltd, China. The cathode slurries of Examples 5-7 were prepared by the method described in Example 1 except different parameters described in Table 1 below were used. The coated cathode films of Examples 5-7 were dried by the method described in Example 1 except different drying conditions described in Table 2 below were used.

Preparation of Anode Slurry

The anode slurries of Examples 2-7 were prepared by the method described in Example 1.

Assembling of Pouch Cells for Examples 2-7

The pouch cells of Examples 2-7 were assembled by the method described in Example 1.

Electrochemical Measurements of Pouch Cells for Examples 2-7

The electrochemical performance of the pouch cells of Examples 2-7 were performed by the method described in Example 1.

The formulation of the cathode slurry of Examples 2-7 are shown in Table 1 below. The drying conditions of the coated cathode film of Examples 2-7 are shown in Table 2 below. The electrochemical performance of the pouch cells of Examples 2-7 are shown in Table 3 below.

Comparative Example 1

A) Preparation of Cathode Active Material

A particulate cathode active material $Li_{1.02}Ni_{0.33}Mn_{0.35}Co_{0.32}O_2$ (NMC333) was obtained by a co-precipitation method followed by calcination at 850° C. The calcinated product was crushed by a jet mill (LNJ-6A, obtained from Mianyang Liuneng Powder Equipment Co., Ltd., Sichuan, China) for about 2.5 hours, followed by passing through a 1,250-mesh sieve to obtain a cathode active material having a particle size D50 of about 6.5 μm.

B) Preparation of Positive Electrode Slurry

A positive electrode slurry was prepared in the same manner as in Example 1, except that a cathode active material having a smaller particle size obtained by the method described in Comparative Example 1 was used. The viscosity of the positive electrode slurry was 2,550 mPa·s.

C) Preparation of Positive Electrode

A positive electrode comprising cathode active material obtained by the method described in Comparative Example 1 was prepared in the same manner as in Example 1, except that the coated film on the aluminum foil was dried at 85° C. and the drying time was about 10 minutes.

It is clear that the positive electrode slurry of Example 1 dries more quickly than the positive electrode slurry of Comparative Example 1. The particle size of the cathode active material influences the drying rate because as a particle becomes smaller, the surface area to volume ratio increases. The larger surface area allows a greater interaction with the solvent, resulting in slower drying. Therefore, cathode slurry of the present invention may lead to a more efficient drying process and improved productivity.

Comparative Example 2

A) Preparation of Cathode Active Material

A particulate cathode active material $LiMn_2O_4$ (LMO) was obtained by a solid-state reaction method followed by calcination at 900° C. The calcinated product was crushed by a jet mill (LNJ-6A, obtained from Mianyang Liuneng Powder Equipment Co., Ltd., Sichuan, China) for about 2 hours, followed by passing through a 625-mesh sieve to obtain a cathode active material having a particle size D50 of about 7.5 µm.

B) Preparation of Positive Electrode Slurry

A positive electrode slurry was prepared in the same manner as in Example 2, except that a cathode active material having a smaller particle size obtained by the method described in Comparative Example 2 was used. The viscosity of the positive electrode slurry was 2,150 mPa·s.

C) Preparation of Positive Electrode

A positive electrode comprising cathode active material obtained by the method described in Comparative Example 2 was prepared in the same manner as in Example 2, except that the coated film on the aluminum foil was dried at 75° C. and the drying time was about 9.5 minutes.

It is clear that the positive electrode slurry of Example 2 dries more quickly than the positive electrode slurry of Comparative Example 2. The particle size of the cathode active material influences the drying rate. Cathode slurry of the present invention may lead to a more efficient drying process and improved productivity.

Preparation of Anode Slurry

The anode slurries of Comparative Examples 1-2 were prepared by the method described in Example 1.

Comparative Examples 3-7

Cathode active materials of Comparative Examples 5 and 6 were obtained from Hunan Rui Xiang New Material Co. Ltd, Changsha, China and HuaGuan HengYuan LiTech Co. Ltd., Qingdao, China respectively. The cathode slurries of Comparative Examples 3-7 were prepared by the method described in Example 1 except different parameters described in Table 1 below were used. The coated cathode films of Comparative Examples 3-7 were dried by the method described in Example 1 except different drying conditions described in Table 2 below were used. The anode slurries of Comparative Examples 3-7 were prepared by the method described in Example 1.

Assembling of Pouch Cells for Comparative Examples 1-7

The pouch cells of Comparative Examples 1-7 were assembled by the method described in Example 1.

Electrochemical Measurements of Pouch Cells for Comparative Examples 1-7

The electrochemical performance of the pouch cells of Comparative Examples 1-7 was performed by the method described in Example 1.

TABLE 1

| | Formulation of cathode slurry | | | | | | | | |
|---|---|---|---|---|---|---|---|---|---|
| | Cathode active material | D50 of cathode active material (µm) | Weight percentage of component (wt. %) | | | | Vapor pressure (kPa) of solvent | | Solid |
| | | | Cathode active material | Conductive agent | Binder material | Solvent | at its drying temperature | pH | Viscosity (mPa · s) | content (wt. %) |
| Example 1 | NMC333 | 42 | 46 | 2 | 2 | NMP + Acetone | 67.8 | / | 1,850 | 50 |
| Example 2 | LMO | 15 | 46 | 1.5 | 2.5 | Water + Ethanol | 33.6 | 11.5 | 1,650 | 50 |
| Example 3 | LMO | 28 | 47 | 1.5 | 1.5 | Water | 39 | 10.7 | 2,300 | 50 |
| Example 4 | NMC532 | 33 | 47 | 1.5 | 1.5 | Acetone | 135 | / | 2,550 | 50 |
| Example 5 | LFP | 25 | 45 | 3 | 2 | Water | 32 | 10.2 | 2,960 | 50 |
| Example 6 | LCO | 21 | 47 | 1.75 | 1.25 | Water | 39 | 10.3 | 2,750 | 50 |
| Example 7 | NMC532 | 30 | 46 | 2.25 | 1.75 | Water | 20 | 12.4 | 2,130 | 50 |
| Comparative Example 1 | NMC333 | 6.5 | 46 | 2 | 2 | NMP + Acetone | 126 | / | 2,550 | 50 |
| Comparative Example 2 | LMO | 7.5 | 46 | 1.5 | 2.5 | Water + Ethanol | 33.6 | 9.8 | 2,150 | 50 |
| Comparative Example 3 | LFP | 25 | 45 | 3 | 2 | NMP | 0.79 | / | 3,020 | 50 |
| Comparative Example 4 | LCO | 21 | 47 | 1.75 | 1.25 | NMP | 1 | / | 3,310 | 50 |
| Comparative Example 5 | NMC532 | 2 | 46 | 2.25 | 1.75 | Water | 20 | 13.5 | 1,890 | 50 |
| Comparative Example 6 | LMO | 70 | 47 | 1.5 | 1.5 | Water | 39 | 10.6 | 2,070 | 50 |
| Comparative Example 7 | LMO | 6.5 | 47 | 1.5 | 1.5 | Water | 101 | 11.3 | 2,380 | 50 |

TABLE 2

Drying conditions of the coated cathode film

| | Temperature (° C.) | Wind speed (m/s) | Relative humidity (%) | Drying time (mins) |
|---|---|---|---|---|
| Example 1 | 65 | 0.1-0.2 | 25-35 | 3 |
| Example 2 | 60 | 0.3-0.5 | 25-40 | 4.5 |
| Example 3 | 75 | 0.1-0.3 | 25-40 | 3 |
| Example 4 | 65 | 0.3-0.5 | 20-40 | 3.5 |
| Example 5 | 70 | 0.1-0.3 | 30-40 | 3.5 |
| Example 6 | 75 | 0.3-0.5 | 30-45 | 4 |
| Example 7 | 60 | 0.1-0.3 | 20-40 | 3 |
| Comparative Example 1 | 85 | 0.1-0.2 | 25-35 | 10 |
| Comparative Example 2 | 75 | 0.3-0.5 | 25-40 | 9.5 |
| Comparative Example 3 | 70 | 0.1-0.3 | 30-40 | 13 |
| Comparative Example 4 | 75 | 0.3-0.5 | 30-45 | 12 |
| Comparative Example 5 | 60 | 0.1-0.3 | 20-40 | 6 |
| Comparative Example 6 | 75 | 0.1-0.3 | 25-40 | 3 |
| Comparative Example 7 | 100 | 0.1-0.2 | 25-40 | 3 |

TABLE 3

Electrochemical performance of pouch cell

| | Voltage range (V) used | No. of cycle | Capacity retention (%) |
|---|---|---|---|
| Example 1 | 3.0-4.2 | 1,731 | 80.9 |
| Example 2 | 3.0-4.2 | 1,903 | 81.3 |
| Example 3 | 3.0-4.2 | 2,279 | 79.5 |
| Example 4 | 3.0-4.2 | 1,776 | 79.8 |
| Example 5 | 2.5-3.6 | 1,748 | 81.7 |
| Example 6 | 3.0-4.2 | 1,592 | 78.7 |
| Example 7 | 3.0-4.2 | 1,943 | 79.0 |
| Comparative Example 1 | 3.0-4.2 | 1,452 | 81.1 |
| Comparative Example 2 | 3.0-4.2 | 1,631 | 80.1 |
| Comparative Example 3 | 2.5-3.6 | 1,654 | 80.1 |
| Comparative Example 4 | 3.0-4.2 | 1,467 | 79.9 |
| Comparative Example 5 | 3.0-4.2 | 1,196 | 79.7 |
| Comparative Example 6 | 3.0-4.2 | 1,698 | 80.0 |
| Comparative Example 7 | 3.0-4.2 | 1,355 | 81.3 |

While the invention has been described with respect to a limited number of embodiments, the specific features of one embodiment should not be attributed to other embodiments of the invention. Variations and modifications from the described embodiments exist. The appended claims intend to cover all those modifications and variations as falling within the scope of the invention.

What is claimed is:

1. A lithium-ion battery cathode slurry, comprising: a cathode active material, a conductive agent, a binder material, and a solvent, wherein the cathode active material has a particle size D50 in the range from about 10 μm to about 50 μm;
wherein the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, polyvinylidene fluoride, poly(vinylidene fluoride)-hexafluoropropene, and combinations thereof;
wherein the solvent is selected from the group consisting of water, pure water, de-ionized water, distilled water, ethanol, isopropanol, methanol, acetone, n-propanol, t-butanol, and combinations thereof; and
wherein the viscosity of the slurry is in the range from 1,500 mPa·s to 3,000 mPa·s.

2. The slurry of claim 1, wherein the cathode active material has a D10 value of at least 3 μm.

3. The slurry of claim 1, wherein the cathode active material has a D90 value of less than or equal to 80 μm.

4. The slurry of claim 1, wherein the cathode active material is present in an amount from 30% to 65% by weight; wherein the conductive agent is present in an amount from 0.8% to 5% by weight; wherein the binder material is present in an amount from 0.5% to 6% by weight; wherein the solvent is present in an amount from 30% to 60% by weight, and wherein all weight % values are based on the total weight of the slurry.

5. The slurry of claim 1, wherein the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiNi_{0.5}Mn_{1.5}O_4$, $LiNi_{0.4}Mn_{1.6}O_4$, composites thereof, and combinations thereof, wherein each x is independently from 0.3 to 0.8; each y is independently from 0 to 0.45; and each z is independently from 0 to 0.2.

6. The slurry of claim 1, wherein the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

7. The slurry of claim 1, wherein a vapor pressure of the solvent is at least 15 kPa.

8. The slurry of claim 1, wherein a pH of the slurry is from about 7 to about 11.

9. The slurry of claim 1, wherein a viscosity of the slurry is in the range from about 1,000 mPa·s to about 4,500 mPa·s.

10. The slurry of claim 1, wherein the solvent has a boiling point of less than 140° C.

11. The slurry of claim 1, wherein a ratio D90/D10 of the cathode active material is from about 3 to about 10.

12. The slurry of claim 1, wherein a particle size distribution of the cathode active material is bimodal with a first peak at about 12 μm and a second peak at about 30 μm.

13. A positive electrode for a lithium-ion battery, the positive electrode comprising: a cathode current collector; and a cathode electrode layer, wherein the cathode electrode layer is the cathode slurry of claim 1 coated on the cathode current collector.

14. A lithium-ion battery comprising: a cathode; an anode; and a separator interposed between the cathode and the anode, wherein at least one of the cathode is the positive electrode of claim 13.

15. The slurry of claim 1, wherein the solvent has a boiling point of less than 120° C.

16. The slurry of claim 1, wherein the solvent has a boiling point of less than 100° C.

17. The slurry of claim 1, wherein a ratio D90/D10 of the cathode active material is from about 5 to about 8.

* * * * *